No. 883,170. PATENTED MAR. 31, 1908.
S. B. CHRISTY.
ELECTRODE FOR THE RECOVERY OF METALS FROM SOLUTIONS
BY ELECTROLYSIS.
APPLICATION FILED MAR. 10, 1906.
2 SHEETS—SHEET 1.
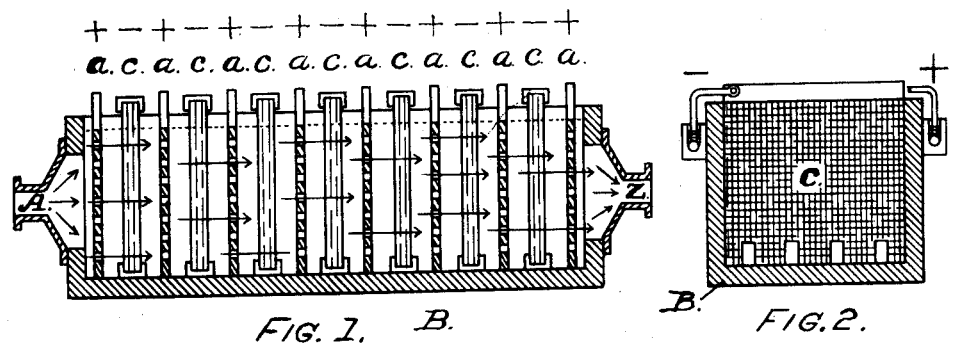
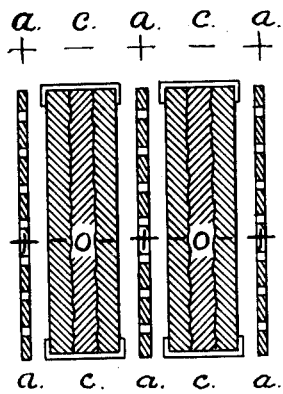
FIG. 3.
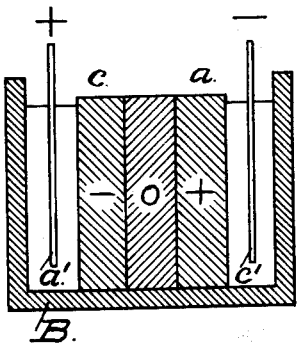
FIG. 4.
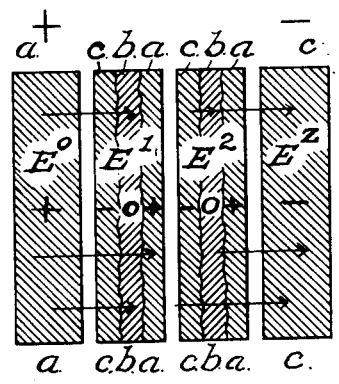
FIG. 5.
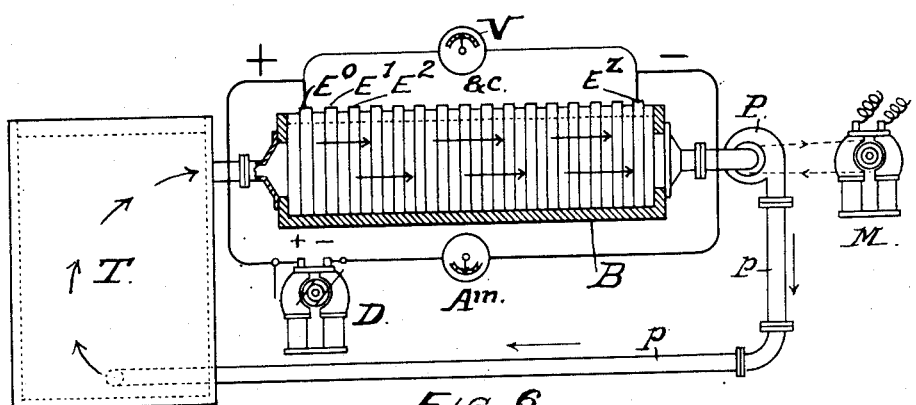
FIG. 6.
WITNESSES;
J. Compton.
D.B. Richards
INVENTOR;
Samuel B. Christy
by Wm. F. Booth
his Attorney.

No. 883,170. PATENTED MAR. 31, 1908.
S. B. CHRISTY.
ELECTRODE FOR THE RECOVERY OF METALS FROM SOLUTIONS
BY ELECTROLYSIS.
APPLICATION FILED MAR. 10, 1906.
2 SHEETS—SHEET 2.
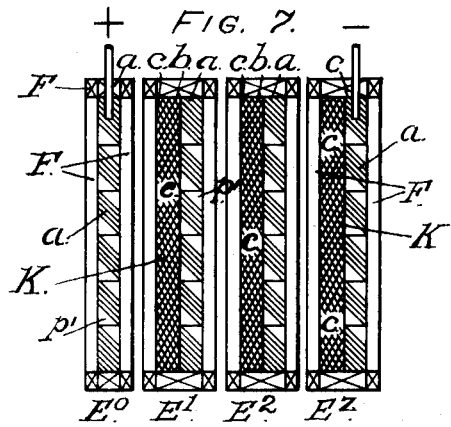
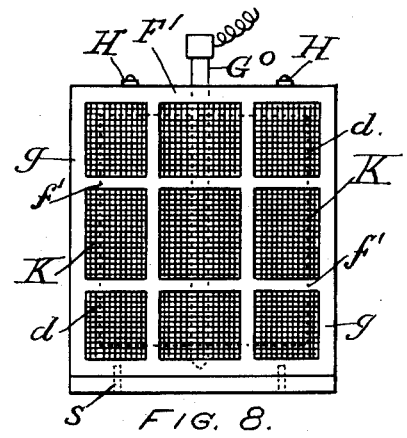
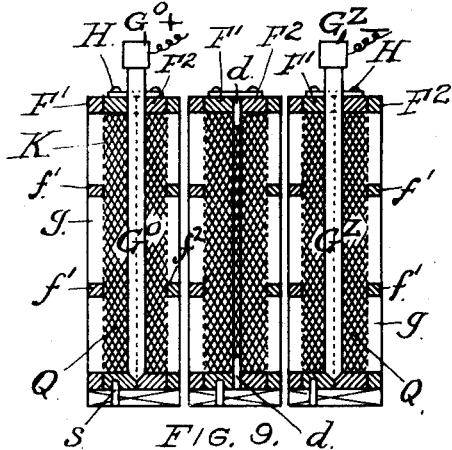
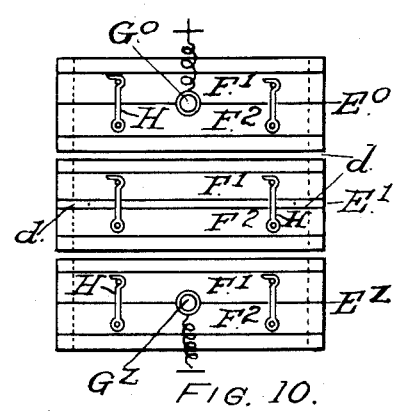
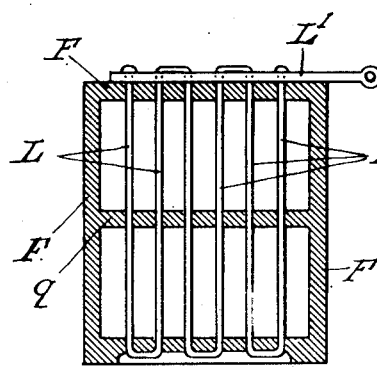
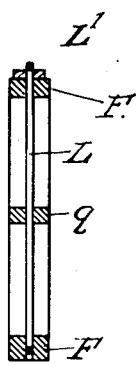
WITNESSES:
J. Compton.
D. Richards
INVENTOR:
Samuel B. Christy
by Wm. F. Booth
his Attorney.

UNITED STATES PATENT OFFICE.

SAMUEL B. CHRISTY, OF BERKELEY, CALIFORNIA.

ELECTRODE FOR THE RECOVERY OF METALS FROM SOLUTIONS BY ELECTROLYSIS.

No. 883,170.     Specification of Letters Patent.     Patented March 31, 1908.

Application filed March 10, 1906. Serial No. 305,247.

*To all whom it may concern:*

Be it known that I, SAMUEL B. CHRISTY, a citizen of the United States, residing at Berkeley, in the county of Alameda, State of California, have invented certain new and useful Improved Electrodes for the Recovery of Metals from Solutions by Electrolysis; and I do hereby declare the following to be a full, clear, and exact description of the same.

My invention relates to electrodes used for the recovery, by electrochemical means, from the dilute solutions that result from the extraction of ores of gold, silver, copper, zinc, lead, nickel, cobalt, and other metals; but particularly gold, silver, and copper; whether these solutions be acid or alkaline; and whether the metals be combined as chlorids, sulfates, bromids, cyanids, or other soluble salts.

My invention consists in novel forms and constructions of these electrodes, in order to adapt them to the most rapid and economical methods of removing the metallic content from such solutions. The term electrode here used covers both the anode, by which the positive current of electricity enters the solution, and the cathode, by which it leaves the solution.

Referring to the accompanying drawings Figure 1 is a vertical longitudinal section through a deposition box containing simple pervious anodes and cathodes. Fig. 2 is a vertical cross section through the same. Fig. 3 is a vertical section through a number of simple pervious anodes and cathodes showing the active and inactive portions of simple pervious cathodes. Fig. 4 is a vertical section through a deposition box containing a compound pervious electrode, showing how a portion of the same acts as an anode, another portion as a cathode, and how the interior portion is inactive. Fig. 5 is a vertical section through a simple pervious anode, and through compound pervious electrodes, and, finally, through a simple pervious cathode. Fig. 6 is a vertical longitudinal section through a deposition box, showing how the same is best arranged to utilize the advantages of compound pervious electrodes. Fig. 7 is a vertical section through simple pervious electrodes and compound pervious electrodes constructed to resist corrosive action of the electrolyte on the anode side of the compound pervious electrodes. Fig. 8 is a vertical elevation of a box arranged to contain the material used in a compound pervious electrode. Fig. 9 is a vertical section through a simple pervious anode, a compound pervious electrode, and a simple pervious cathode. Fig. 10 is a top view of the same. Fig. 11 is a vertical sectional elevation of an improved form of a simple pervious anode composed of lead wires coated with peroxid of lead, stretched upon a suitable frame. Fig. 12 is a vertical section through the same.

The difficulties of recovering metals from such dilute solutions as occur in the extraction of ores is very much greater than, and of an entirely different nature from those which occur in ordinary electroplating of articles with gold, silver, copper, and other metals. In the latter case one has to do with concentrated solutions of approximately constant composition; while in the recovery of metals from solutions obtained from the extraction of ores, it is necessary to treat solutions which are constantly being depleted of their metallic content, thus becoming poorer conductors; and to remove, substantially, all of the metals contained in such solutions. This is a problem of the greatest difficulty. In order that the metal shall be completely removed in a reasonable time, it is necessary to have numerous cathode surfaces of enormous area, and a similar number of anodes but preferably, when possible, of smaller area; and the best results are obtained by circulating the solution in such a manner that it is brought into intimate contact with anodes and cathodes in rapid alternation so as to maintain a constant supply of metal at the cathode for the electric current to precipitate, as has been fully explained in my U. S. Patent, No. 756,328, dated April 5, 1904. In order to get effective precipitation, it is necessary to have a large number of pervious anodes and cathodes through which the solution may circulate. The form of deposition box preferred in said patent is herein shown in Figs. 1 and 2, which are here repeated for the sake of a better understanding of my present invention. In these figures, B is the deposition box. The solution to be treated enters the deposition box in Fig. 1 at A, circulates, as shown by the arrows, through the pervious anodes $a$ and pervious cathodes $c$ and passes out at Z. The pervious anodes $a$ are made of some insoluble electric conducting substance; and the pervious cathodes $c$ are made of some pervious electro-conducting substance of sufficiently great surface area. The form of cathode shown in Figs. 1 and 2, marked c, I shall call in the following specifications, simple pervious cathodes; and the anodes marked a I shall call simple pervious anodes. The electrodes shown in Figs. 1 and 2 have given excellent results in the precipitation of metals from their solutions, but they have the great disadvantage of requiring an enormous number of electrical connections—one being required for each anode, and one for each cathode. As a consequence, whenever an anode or cathode is to be removed, a certain amount of trouble is created in establishing and securing the electrical connections; and constant watchfulness is necessary to maintain good electrical contacts.

In Fig. 3 are shown two such pervious cathodes marked c, which may be supposed to be made of wire cloth, or fragments of coke or graphite contained in a suitable box with sides of cheese-cloth, and placed between pervious anodes a. It would, ordinarily, be supposed that the whole of the inner surface of said pervious cathodes would be effective for precipitating metal upon it. I have, however, found that such is not the case. The metal is precipitated by the electric current on such pervious cathodes only to a moderate depth. This depth depends on the permeability of the material used, and increases with its perviousness, or the free interstitial space. When granules of graphite, or of coke, about one-eighth of an inch in diameter, are placed in such frames, the metal is deposited for a depth of about 1 to 3 granules, according to the perviousness. With wire cloth it penetrates to a greater depth, but in all cases if the thickness of said pervious electrode exceeds a certain amount, as shown in Fig. 3, the interior portion of the cathode (marked o) is practically with no deposit upon it; while the outer portions (marked with a minus sign) become coated with metal. The interior portion (marked o) may be said to be in an electrolytic shadow, and consequently to receive from the electric current practically no metal upon it. Here, and in what follows in these specifications regarding this neutral portion of pervious electrodes I refer only to the metal deposited by the electric current and not to the metal deposited by the chemical action of the material of the electrode itself, upon the solution as sometimes happens. The depth through which the current will penetrate and act on the solution varies from one-eighth to one-half an inch with ordinary degrees of perviousness. Now, the more compact the particles of the electric conducting substance, the less deep will the metallic deposit penetrate the cathode, until finally, when the perviousness diminishes to that of a sheet of compact metal, the metallic deposit does not penetrate the cathode at all, but is all deposited on the exterior surface of said solid cathode. Now the discovery of this fact, which at first sight appears to be a serious disadvantage in the use of pervious cathodes, has led me to devise a simplification in the pervious electrodes used for depositing metals. To illustrate this I refer to Fig. 4.

Fig. 4 shows a deposition box B which is to contain a solution of some metal such as copper sulfate, or cyanid of gold or silver and potassium. At $a'$ is shown an insoluble anode of carbon or platinum, and at $c'$ a cathode of carbon or platinum. Now if there be placed in the solution between these anodes and cathodes by which the current enters and leaves the solution, a pervious electrode made either of sheets of wire cloth, or a mass of granules of coke or graphite contained in a suitable pervious vessel, and a positive electric current caused to enter the solution at the anode $a'$, and to pass out of the solution by the cathode $c'$, the end of the pervious electrode c nearest the anode $a'$ becomes charged with negative electricity, as indicated by the minus sign, and copper or gold and silver will be deposited upon that end of the pervious electrode for a distance of from one-eighth to one-half an inch or more, depending upon the perviousness. The opposite side, indicated by the plus sign, of the pervious electrode (marked a) becomes charged with positive electricity for a similar distance back from its face. The intermediate portion of the pervious electrode (marked O) is neither negatively nor positively electrified, and practically no metal will be deposited there by the electric current. My first improvement consists in utilizing this idea in the construction of what I here designate as a compound pervious electrode, one face of which acts as an anode, and the other face of which acts as a cathode, and between which there exists a portion acting neither as a cathode nor an anode, but simply conducting electricity just as a solid metallic conductor would do. Fig. 5 shows the manner in which said compound pervious electrodes are used. The deposition box is not shown in this figure, but only the electrodes. The compound pervious electrodes are marked $E'$ and $E^2$. They may be of any number desired. The positive electric current enters the solution by means of a simple pervious anode $E°$, the whole of which becomes charged with positive electricity. At a suitable distance, preferably as small as possible without short-circuiting, is placed the compound pervious electrode marked $E'$. The side c nearest the anode $E°$ acts as a cathode and is marked with a minus sign. The middle portion b is neutral and is marked O. The other side a acts as an anode and is marked with a plus sign. At a suitable distance is placed a second compound pervious electrode E², and as many more as may be necessary, and finally a simple pervious cathode E˟ and also marked with a minus sign through which the electric current leaves the solution. The manner in which I prefer to arrange such a combination of compound pervious electrodes is shown in Fig. 6. At T is shown a large tank or reservoir containing the solution to be treated. B is the deposition box. The solution is forced to circulate through said deposition box B by means of a centrifugal pump P, driven by a motor M, or other suitable means, from the tank T through the deposition box B, and back again through pipe $p$, repeatedly. It is also possible to circulate the solution from the tank through the box once only, provided the box is made sufficiently long to secure complete precipitation in a single passage; but the method here shown in Fig. 6 is much preferable, and I prefer to use it, or its equivalent. At D is shown a shunt wound dynamo—or other source of electricity—giving a direct current. From D the positive electric current flows to the simple pervious anode E°. It thus enters the box, passes through the solution to compound pervious electrode E', then through the solution again to compound pervious electrode E², etc., until it finally reaches the simple pervious cathode E˟, by which it leaves the box, and returns through the ammeter $A^m$ to the negative pole of the dynamo D. At V is shown a suitable voltmeter for determining the voltage between the terminals of the deposition box B. In using these compound pervious electrodes, Fig. 5 shows what takes place. Each of the compound pervious electrodes E', E², etc., receives a metallic deposit only upon the side $c$ which is negatively electrified. The side $a$ receives no metallic deposit and the portions $b$ practically none, unless by the chemical action of the electrode itself. The portions marked $a$ being an anode, are liable to be attacked by the solution unless made of some substance insoluble in the electrolyte, such as platinum or graphite—particularly that graphite made in the electric furnace—but in some solutions, as in alkaline solutions containing no chlorids or sulfates, iron may be used for this purpose; but this form of construction precludes the use of soluble metals such as copper, zinc, etc., on the anode side of pervious electrode. In order to make it possible to utilize such metals or other oxidizable electro-conducting substances as a material for use on the cathode side of compound pervious electrodes, I have devised the form of compound pervious electrodes shown in Fig. 7. E° shows a simple pervious anode which introduces the positive current into the solution. E' and E² show a new form of compound pervious electrodes, and E˟ shows a compound pervious electrode which is used to act as if it were a simple pervious cathode. This new form of compound pervious electrode is so arranged that the portion marked $a$ which acts as an anode is made of some suitable substance which is at once an electrical conductor and is insoluble in the electrolyte. For this purpose I use preferably a sheet of graphite made in the electric furnace which has perforations $p'$ bored through it at an angle of about 45 degrees. Instead of making this portion of the cathode of a single sheet of graphite, it may be made of a number of bars of graphite superimposed upon each other as shown in Fig. 7, by the horizontal lines which cross the inclined apertures in the graphite sheets at the point marked $p'$, provided that the several bars are in close contact and are perforated with inclined holes $p'$ or with edges beveled as shown in Fig. 7, above and below $p'$ so as to allow the solution to pass through the graphite bars. On the side of the compound pervious electrodes E' and E² is placed the cathode side $cc$ of the compound pervious electrode, which may be made of wire cloth, or fragments of any electro conducting substance whatever, being always in electric contact with the anode side of the electrode of which it forms a part. The purpose of this form of construction is to protect the anode side of the electrode from the corrosive action of the electrolyte. Instead of graphite, platinum or in the absence of chlorids and sulfates, perforated sheet iron may be used, but in all cases the aperture should be inclined in such a manner as to protect the cathode side from the direct action of the oxidizing electric current; while at the same time the solution is able to pass through the pervious cathode.

Instead of using solid sheets or bars of graphite for the anode side of the compound pervious electrodes, the anode side may be made of granules of coke or electro-graphite retained in place by a suitable layer of coarsely woven bobbinet of a size just smaller than the grains, so as to retain them in place without preventing electrical contact with the cathode side of said compound pervious electrode. The thickness of the layer of conducting grains on the anode side should be sufficient to prevent the electrical current from oxidizing and dissolving the metal deposited upon the cathode side of said compound pervious electrode. A thickness of granules of from 5 to 6 times the diameter of the grains of coke or graphite used is usually sufficient.

It is seldom that this peculiar form of construction in Fig. 7 and its equivalent here described, will be called for, but it is extremely useful in reducing the anode area below that of the cathode area where it is desired to reduce the oxidizing effect on the solution. It is necessary that the anode and cathode sides of each electrode be in electrical contact either by direct contact with the anode plates or granules or else by means of metallic or graphite rods suitably connecting the two sides of each electrode.

The advantages of compound pervious electrodes are very great when a very large number of electrodes are necessary in order to secure complete deposition of the metallic content of the solution; for in this case we are required to have only two electric connections—the one by which the positive current enters the deposition box, and the one by which it leaves it. All the other electrodes are entirely without electric connections. This relieves the operator from a great and endless source of trouble and annoyance, and simplifies the construction. Another advantage of this form of construction is that shunt wound direct current dynamos, such as are ordinarily used for electric lighting, may be used to advantage for the precipitation of metals, and a special machine wound for quantity currents is no longer necessary. Thus supposing one has at his disposition a shunt wound direct current dynamo of 110 volts, and say, 10 amperes: supposing that the difference of potential between the successive electrodes which is found necessary to give a good deposit is 3 volts. In this case, besides the simple pervious anode by which the current enters the deposition box B, and the simple pervious cathode by which it leaves the deposition box, there are required 35 compound pervious electrodes, making in all 36 current gaps in the box each of which causing a tension of 3 volts, would make altogether 108 volts, which is about the capacity of the machine. When this installation is set up and operated, there passes through each electrode a current of 10 amperes, and each electrode receives exactly the same amount of current. This form of construction, therefore, leads to very great simplicity in installation and facility in management. While I prefer to place the electrodes vertically in said box, as shown in Fig. 6, for the reason that they are thus most easily removed and replaced, they may be placed horizontally or in any other position.

I do not claim to have discovered the advantages of compound electrodes in general, as such electrodes made of solid impervious material have been used previously in electrometallurgy, but I do claim to have discovered the fact that pervious electrodes may also act as compound electrodes—in the manner that I have described, with great advantage. The material of which these compound pervious electrodes is made will depend upon the solution to be treated and the metal to be recovered. They may be made of any pervious material which is at once an electric conductor, and is not too much acted upon on the anode side by the solution; thus, metallic wire cloth, metallic shot, or metallic fragments, or fragments of coke or of graphite of about the size of shot may be used. In case fragmentary material is used, it is necessary to retain the same in a suitable wooden frame covered on the free faces with cheese-cloth or some other pervious substance. I have also found a substance occasionally produced in making coke, which is extremely well adapted to this purpose. It is called "Coke Whiskers", and has the advantage of being an excellent electrical conductor and is hardly acted upon at all by ordinary solutions even when acting as an anode. This substance consists of small wire-like fragments of coke about the size of human hair, and it possesses an enormous active surface for precipitation. But I do not confine myself to any one of the materials named, as any substance such as cloth made conducting by being coated with some conducting substance, either graphite or some metallic film, may be used; but I prefer the substance which is mentioned in the next paragraph.

My next improvement consists in a novel form of construction of pervious electrodes, both simple pervious and compound pervious electrodes. A satisfactory cathode for the recovery of metals from dilute solutions must be pervious; must possess a maximum cathode surface in a minimum volume; must be cheap; must be composed of material easily obtained in remote mining districts; must be little acted on by corrosive solutions; and must allow of easy recovery of the precipitated metals from the electrodes. All of these difficult conditions are for the first time admirably realized by my new form of pervious electrodes. This novel and improved form of pervious electrodes consists of a box with two pervious sides inclosing a pervious mass of either fragmental, or preferably filamental charcoal made electro-conducting by suitable means, as will be more fully described in what follows.

Common commercial charcoal as ordinarily produced is practically non-conducting, but by very simple means it may be rendered a sufficiently good conductor to enable it to be used as an electrode for the deposition of metals. There are numerous methods by which this may be accomplished,—thus if the charcoal is impregnated with some metallic salt, such as a salt of gold, silver, copper, or other metal easily reduced by the chemical action of the charcoal itself, as in the case of chlorid of gold, or by heating the charcoal after impregnation with said salt as is the case with most metallic salts, or by the action of other chemical agents such as sulfurous acid, sulfohydric acid or an alkaline sulfid or by heating the same to a red heat only, so that there is deposited on the surface of the charcoal a film, either of the metal itself, or of some conducting compound of the metal, such as sulfid of copper or sulfid of silver; the charcoal so treated then becomes a sufficiently good conductor to act as an electrode. I have experimented with nitrate of silver, double cyanid of silver and potassium, chlorid of gold, double cyanid of gold and potassium, sulfate of copper and many other metallic salts. Any of these forms may be used, but all have the disadvantage of requiring the addition of some metallic substance to the charcoal, which in many cases, has to be removed after treatment.

A second and much simpler method, which I much prefer, is to heat the charcoal, preferably during its manufacture, to a temperature of either a yellowish or white heat. A yellow heat is ordinarily sufficient. I have also found that it becomes a better conductor if the charcoal is charred under pressure, and that the addition of small amounts of such substances as rosin, asphaltum, bitumen, and other hydrocarbons, during the charring, particularly under pressure, tends to make the charcoal a better conductor so that the material may be heated at a lower temperature than a yellow heat, and still become an electric conductor. When so treated by any of these methods, the charcoal conducts the electric current sufficiently well to serve as a cathode for the continuous deposition of gold, silver, copper and other metals. I am well aware that charcoal has been used for precipitating gold from solutions of chlorid of gold, and also from cyanid solutions without the use of an electric current. In this case it acts chemically, and the amount of metal it will precipitate is very limited, being ordinarily not more than one-fourth or at most a pound to a hundred pounds of the charcoal from gold cyanid solutions and eight pounds from chlorid of gold per hundred pounds charcoal.

When used as a cathode, as I shall explain later, the charcoal is simply used as a conducting substance upon which indefinite quantities of gold, silver, copper and other metals may be precipitated so long as the current flows. I have thus been able to precipitate at a rate such that upon a hundred pounds of charcoal, several hundred pounds of metal would be deposited; there being no limit to the amount that can be precipitated in my method, except the convenience of the operator. Now, while charcoal, thus made an electric conductor by suitable means, may be used in any pervious form whatever either fragmental or filamental, I prefer to arrange the pervious electrodes either simple pervious electrodes—as described in the preceding section and shown in Figs. 1, 2, and 3—or compound pervious electrodes—as described in Figs. 4, 5 and 6. Either form may be used as may be most convenient. In order to secure the maximum precipitating surface in the minimum volume for such pervious electrodes I prefer to use the charcoal in a filamental form. For this purpose I prefer to use charcoal, made from some fibrous organic material such as ordinary cotton; the leaves of pine trees, commonly called pine needles; or the fiber from the husks of cocoanuts; or hemp grass, or straw, or any other fibrous material of organic nature. As a rule, however, I find that cotton charcoal is usually so fine that it somewhat impedes the passage of the solution through it, and that it requires a very high temperature to render it an electric conductor. Pine needles make a very good pervious charcoal, but they have the serious disadvantage of holding a large amount of ash, amounting to from 20 to 30 per cent. of their weight. The most suitable material that I have found for the purpose is charcoal made from the substance commonly used for packing freight, called "Excelsior"; a material usually made from soft pine wood in the form of long shavings not more than one-sixteenth of an inch in width, and much less in thickness. The charcoal made from this material, when prepared as I have described, is an excellent conductor of electricity and possesses a very small amount of ash, not usually more than two or three per cent. of its weight. Charcoal made from common saw dust may also be used, but it is less pervious and hence not usually so well fitted for the purpose as that made from excelsior.

As charcoal is ordinarily prepared it is not an electric conductor and cannot be used as an electrode, but when prepared by any of the methods described above, it works in a thoroughly satisfactory manner. As, however, it must be an electric conductor to be of any service, it is important that each lot of charcoal used for the purpose should be carefully tested before use to determine whether it has been properly prepared; otherwise no good results will follow its use. A simple way to determine this is to take a sample of the charcoal to be tested and make it a cathode in a solution of sulfate of copper. If, during the passage of the electric current, the copper is deposited promptly upon the charcoal, it is a sign that it is a sufficiently good conductor. An even simpler way is to immerse the poles of an electric battery having a tension of about 4 or 5 volts into a bunch of the filaments. If when the circuit is made and broken by touching the charcoal at different points with one of the wires, the other being in contact with it, a small spark appears when the current is made and broken, it is a sign that the same is a sufficiently good conductor for actual use. Ordinary commercial charcoal does not respond to these tests unless it should have been accidentally overheated when manufactured.

As already stated, the charcoal filaments so prepared may be used either as simple pervious electrodes or as compound pervious electrodes, as may be most convenient. For this purpose I prefer to construct the electrodes as shown in Figs. 8, 9, and 10. Fig. 8 shows one of these pervious electrodes. Fig. 9 is a vertical cross-section through three of these pervious electrodes. Fig. 10 is a view of three of these pervious electrodes looked at from above. The deposition box in which they are to be placed is not shown in these figures. The letters in all three of these figures have the same significance. Each of the pervious electrodes is preferably made in the form of a wooden box with two pervious sides. The box is made in two parts designated by the letters $F'$ and $F^2$ in each case. The sides of the box across the direction of the circulation are made preferably of ordinary cheese-cloth $K$. This cheese-cloth is stretched tight as a drum in the process of manufacture and is placed on one side of both parts of the box like a sheet of glass in a window frame. Outside of this cheese-cloth frame is placed a wooden frame $g$, made either about one-eighth or one-fourth of an inch thick, to separate the cheese-cloth partitions of adjacent frames from each other. If the frame is made large enough to allow the cheese-cloth to bulge when filled with charcoal, thus bringing about a short-circuit between the electrodes, the cheese-cloth is stiffened at intervals of from 4 to 6 inches by means of strips of wood, $f'$ and $f^2$, like the division sashes of a window frame, for the purpose of preventing short-circuits. In small electrodes the thickness of these strips $f'$ and $f^2$ and $g$ need not exceed one-eighth of an inch. For large frames it would be safer to make them one-fourth of an inch each in thickness. The cheese-cloth may also be stiffened by ribs placed in the interior of the box, provided the electric continuity of the charcoal is not destroyed. Each electrode box is made of two parts which fit together, making a single box. These parts are $F'$ and $F^2$. They are fastened at the bottom by suitable pins (marked $s$) made preferably of wood—or in some equivalent manner. At the top they may be fastened together by hooks H.

The part marked $F^1$ instead of being made to contain charcoal, may be made to act simply as a pervious lid to the other part of the box, $F^2$, containing charcoal. In this case the frame $F^1$ is made preferably about ¼ inch deep with the cheese-cloth stretched on the inner side. The two parts $F^1$ and $F^2$ are thus fastened together in the same manner as that shown in Figs. 8, 9 and 10. This form of electrode is easier to fill and empty than the other forms, particularly when the lid is placed on the cathode side of the compound pervious electrode boxes; for the metal is then deposited just under the lid where it is easily removed.

In charging the boxes ready for use they are filled with filamental charcoal $Q$ made electro-conducting by any one of the methods previously described. When "excelsior" charcoal is used, I prefer to place in each cubic foot of interior space about 2 or 4 pounds of the charcoal filaments. When this is done there is left about 90 to 95 per cent. of void space through which the solution may circulate, and which becomes filled with gold, silver, copper, or other metal which is being precipitated. It is necessary to remember that the pervious charcoal is very brittle, hence it is important that it should be placed in the box with the least amount of breakage and that the cheese-cloth should be sufficiently fine to prevent the loss of small particles of anything but the finest dust from the charcoal. Each part of the box is carefully filled so as to make a depth of charcoal, preferably about half an inch, and in such a manner as to be perfectly uniform in all parts and to a height above the line of the sloution in the deposition box. After filling each half of the box in the manner described, the two parts of the box are assembled and fastened together by the pegs at the bottom and the hooks at the top, or by other suitable means. After filling and assembling the two parts, the packing should be close enough when held up to the light to prevent the light from penetrating any part of the compound pervious electrodes. In order to prevent the electric current from leaking along the bottom and edges of the frames, I place a thin wooden diaphragm $d$ of wood or cloth soaked in paraffin paint in such a manner as to prevent the leakage of the electric current through the box without passing through the charcoal. It should project into the interior of the box about one-fourth inch. Instead of this diaphragm, a tongue of wood may be left on the inner edge of either or both half frames, or instead, the edges of the cheese-cloth for about ¼ inch on the anode side may be painted with thick paraffin paint.

In case the boxes are to serve as simple pervious electrodes, each one has inserted through the center of the box in a vertical position, a connecting wire of iron or some other metal, or preferably a rod of electro-graphite, so as to make electrical connection with the main line carrying the negative current; and the several pervious electrodes thus produced are placed between suitable pervious anodes (as shown in Fig. 1). When the said boxes are intended to serve as compound pervious electrodes (as in Fig. 6), only the first and the last of these boxes are connected by means of these connecting rods (marked $G^o$ and $G^z$ in Figs. 8, 9 and 10).

Figs. 9 and 10 show the arrangement used in compound pervious electrodes of this type set up ready for use, excepting only that the deposition box and the solution are not shown. In Figs. 9 and 10, E° is a simple pervious anode with the connecting electrode G° which is connected with the positive conductor. E' is a compound pervious electrode without any conducting rod, and as many others similar to E' may be inserted to the right of it as may be desired. Finally the positive current escapes to the negative conductor G$^z$ through the simple pervious cathode E$^z$, the current escaping finally through the conductor rod G$^z$.

If the electrodes used are simple pervious cathodes with pervious anodes placed between the several pervious cathodes, (as shown in Fig. 1), the charcoal on either side of the pervious electrodes next to the cheesecloth becomes coated with a film of the metal deposited, either gold, silver, copper, or mixtures of these metals as the case may be. In case the electrodes are arranged as compound pervious electrodes, as E' in Figs. 9 and 10, the whole being arranged as in Fig. 6, only the cathode side of the charcoal in each of the compound pervious electrodes becomes coated with the metal precipitated, the other side being either not acted upon at all, or being slightly oxidized by the current. To reduce this oxidation to a minimum I prefer to pack the charcoal closer on the anode than on the cathode side.

Instead of using electro-conducting charcoal made by the methods previously described, I may of course fill these boxes with any other pervious conducting material such as coke or fragments of graphite. Also the material known as "coke whiskers" may be used, and also graphite in a filamental form made by igniting the filamental charcoal to an intense white heat in the electric furnace. The "coke whiskers" and the filamental graphite are almost entirely unacted upon by the solution, but the charcoal is very slowly oxidized on the anode side in most cases. In order to prevent this, I may also fill the anode side of the compound pervious electrodes either with pervious graphite plates or with filamental carbon in the form of "coke whiskers" or filamental graphite (as shown in Fig. 7 and already described), the cathode side being filled with filamental charcoal.

After the metal has been precipitated in a sufficient amount upon the filamental charcoal or graphite or coke, I may recover it by making said cathodes anodes in a suitable solution on the principle explained in my previous American patents 643,096, Feb. 6, 1900 and 756,328, September 9, 1903, or, in the case that filamental charcoal is used, I may recover the metals in a very simple manner by simply burning the charcoal in a suitable furnace and smelting the ashes with suitable fluxes and if necessary suitable reducing agents. If the charcoal has become coated with many times its own weight of the metal, the product may be compressed into bricks, and melted down in a reverberatory furnace. In these ways I have been able to recover gold, silver, and copper with great ease and little expense.

In some cases it is necessary to use a large number of simple pervious anodes and cathodes, compound pervious electrodes not being suitable, and in these cases it is necessary to use a substance insoluble in the solution for the anode which introduces the positive current. I have found that graphite made in the electric furnace, either in the form of perforated sheets or in the form of rods of graphite inserted into a conducting rod either of graphite or metal, and projecting from the same like the teeth of a comb, is very satisfactory with all solutions excepting those which contain sulfates, as sulfates of copper, sodium, etc. But when sulfates are present in the solution, the sulfuric acid set free at the anode attacks the graphite rods and slowly disintegrates them. In such cases it is necessary to use some other substance. This is the case with sulfate of copper and also with cyanid solutions containing alkaline sulfates. In such cases it has been customary to use strips or perforated sheets of lead coated with peroxid of lead. This system gives excellent results with sulfate of copper and also with cyanid solutions containing alkaline sulfates, so long as the coating of peroxid of lead on the surface of the plate remains intact; but this substance is of a rather brittle nature, and if the lead is bent or scratched in any manner, it nearly always scales off and exposes the naked lead beneath the oxid coating. When this takes place the anode deteriorates very rapidly. This is a particular difficulty in cyanid solutions, as the lead becomes coated with dense white crusts of cyanid of lead to the destruction of the anode and the loss of cyanid. I have discovered a very effective means for overcoming this difficulty. For this purpose I construct a frame made of wood and shown in Figs. 11 and 12. Fig. 11 shows a side sectional elevation across the anode. Fig. 12 shows a vertical section through the anode. The wooden frame is marked F. When the frames are made large I prefer to strengthen them by the horizontal cross bars $q$. I then take strips of lead wire L from one-eighth to one-fourth of an inch in thickness, and of cylindrical form—and stretch them up and down through suitable holes bored in the horizontal bars of the frame, at distances apart of from one-half inch to one inch or more, so as to stretch the lead wires like the wires of a harp alternately up and down through the frame. The wires are connected on the top by a busbar L' of lead sufficiently strong to carry the total current, the individual wires being so proportioned as to carry the electric current, which they must carry without overheating. Wherever wood is mentioned in these specifications, I prefer to protect the wood from the solution by painting it with the so-called "P and B" paraffin paint, or some other similar substance. The bottoms of the lead wires are kept from touching the bottom of the box by placing them in a groove in the lower horizontal cross bar. Where the wires pass over the lead busbar at the top they are secured to said busbar,—preferably by the process of lead-burning rather than soldering, although soldering may be used, if necessary. The end of the lead busbar is connected at $w$ with a copper wire which connects the same with the main busbar of conductor introducing the positive current. After the anodes are thus constructed, I prepare the lead wires in the following manner.

In order to get a clean metallic surface on the outside of the wires free from all insulating materials, I connect the wire with the negative pole of a suitable source of electrical energy, making the lead wires cathodes for a short time in a solution of plumbate of soda. Any oxid or carbonate or hydrate that may have been formed on the outside of the lead wires becomes thus reduced to the metallic state and an even surface is produced on the outside of the wire of filamental lead. Without waiting for the film to oxidize in any way, the electric current is immediately reversed and the lead wires are made anodes in the same solution and are kept there until a firm, adherent, dark chocolate brown colored coating or peroxid of lead forms over every portion of the wire exposed to the action of the current. When this coating is formed to a sufficient thickness to protect every portion of the wire, the same is then covered with a cylindrical film or tube of firmly adherent peroxid of lead. The anodes are then ready to be inserted into the bath of copper sulfate or cyanid of gold or silver or other solution to be treated, for the purpose of acting as pervious peroxidized lead anodes. These peroxid coated lead wires may also be replaced by solid rods of lead peroxid similarly arranged in a suitable frame.

I do not claim to have discovered or invented pervious electrodes nor peroxidized lead anodes, nor compound solid or impervious electrodes. But What I do claim as new and desire to secure by Letters Patent is 1. Compound pervious electrodes, each consisting of a suitable mass of pervious electro-conducting material, arranged to act as a cathode on one side and as an anode on the other, and contained in a suitable portable non-conducting frame with pervious sides; means for retaining said compound pervious electrodes at suitable intervals in the solution to be treated, between a suitable anode and a suitable cathode, both preferably also pervious; means for connecting, by suitable metallic conductors, said anode with the positive and said cathode with the negative pole of an external direct-current electric generator of sufficient voltage to force a direct electric current to pass continuously in the same direction and in series through said anode, the several intervening compound pervious electrodes, the cathode, and the intervening solution in which all are placed; and means for passing said electric current from said anode through the solution to each intervening compound pervious electrode, through the same and the intervening solution to the next intervening compound pervious electrode, and so on finally to the cathode at the end of the series, without the use of metallic conductors, and in such a manner as to cause that face of each intervening compound pervious electrode nearest the anode to be negatively electrified, and that face nearest the cathode to be positively electrified, and so that there is a continuous fall of voltage from the anode where the current enters the solution, to the cathode, where it leaves it, all substantially as described.

2. Compound pervious electrodes consisting of fragmental or filamental charcoal made electro-conducting by suitable means; means for retaining the same in a box of non-conducting material provided with pervious sides through which the solution to be treated may circulate; and means for passing a direct electric current through said solution and charcoal in such a manner that one face of each of said pervious electro-conducting charcoal masses shall be negatively electrified while the other is positively electrified.

3. Compound pervious electrodes containing on the anode side some suitable pervious electro-conducting material insoluble in the electrolyte, and on the cathode side some suitable pervious electro-conducting substance in electric contact with the anode side.

4. Simple pervious electrodes, composed of fragmental or filamental charcoal, made electro-conducting by suitable means, contained in suitable portable non-conducting frames with pervious sides; and means for connecting said simple pervious electrodes to the positive and negative poles of an external direct-current electric generator, so as to continuously charge all external parts of said pervious electrodes with either positive or negative electricity, according as they are to serve as anodes or cathodes, all substantially as described.

5. Simple pervious anodes made of wires presenting a peroxid of lead surface, stretched upon suitable wooden frames.

In witness whereof I have hereunto set my hand.

SAMUEL B. CHRISTY.

Witnesses:
J. COMPTON,
D. B. RICHARDS.